(12) United States Patent
Rabbach et al.

(10) Patent No.: US 6,880,888 B2
(45) Date of Patent: Apr. 19, 2005

(54) FITTING FOR A VEHICLE SEAT

(75) Inventors: Andreas Rabbach, Solingen (DE); Hilmar Wahlen, Hückeswagen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 79 days.

(21) Appl. No.: 10/323,127

(22) Filed: Dec. 18, 2002

(65) Prior Publication Data

US 2003/0090138 A1 May 15, 2003

Related U.S. Application Data

(63) Continuation of application No. PCT/EP02/03208, filed on Mar. 22, 2002.

(30) Foreign Application Priority Data

Mar. 31, 2001 (DE) .......................... 101 16 160

(51) Int. Cl.[7] .................................. B60N 2/02
(52) U.S. Cl. ................................. 297/378.12
(58) Field of Search .............. 297/378.11, 378.12, 297/378.1, 354.12, 367

(56) References Cited

U.S. PATENT DOCUMENTS

| | | | | |
|---|---|---|---|---|
| 4,103,964 A | * | 8/1978 | Klingelhofer et al. | 297/367 |
| 4,113,308 A | * | 9/1978 | Werner et al. | 297/362 |
| 4,252,369 A | * | 2/1981 | Kluting | |
| 4,294,488 A | * | 10/1981 | Pickles | 297/367 |
| 4,358,155 A | * | 11/1982 | Osterhold et al. | |
| 4,484,779 A | | 11/1984 | Suzuki | |
| 4,973,104 A | | 11/1990 | Nakayama et al. | |
| 5,052,748 A | | 10/1991 | Fourrey et al. | |
| 5,611,600 A | * | 3/1997 | Busch et al. | 297/378.12 |
| 5,904,403 A | * | 5/1999 | Unckrich | 297/378.12 |
| 6,328,381 B1 | | 12/2001 | Smuk | |
| 6,447,066 B1 | | 9/2002 | Chabanne et al. | |

FOREIGN PATENT DOCUMENTS

| | | |
|---|---|---|
| DE | 39 14 083 A1 | 10/1990 |
| EP | 0 381 559 A1 | 8/1990 |
| EP | 0 410 814 A2 | 1/1991 |
| EP | 0 928 717 A1 | 7/1999 |
| EP | 1 067 013 A1 | 1/2001 |
| GB | 2 212 208 A | 7/1989 |
| GB | 2 231 617 A | 11/1990 |
| JP | 58221728 A | 12/1983 |
| WO | WO 98/45136 A1 | 10/1998 |

* cited by examiner

Primary Examiner—Peter M. Cuomo
Assistant Examiner—Stephen Vu
(74) Attorney, Agent, or Firm—Alston & Bird LLP

(57) ABSTRACT

In the case of a fitting (5) for a vehicle seat (1), in particular for a motor vehicle seat, having a lockable latching fitting (7) for the fine adjustment of the inclination and locking of a backrest (3) between a plurality of use positions, and a pivotable free-pivoting device (11, 23) for moving the backrest (3) beyond the use positions, a coupling (35) is provided, by way of which unlocking of the free-pivoting device (11, 23) only takes place after unlocking of the latching fitting (7).

19 Claims, 4 Drawing Sheets

FITTING FOR A VEHICLE SEAT

CROSS-REFERENCE TO RELATED APPLICATION

This is a continuation of PCT/EP02/03208, which was filed Mar. 22, 2002, published in German, and is entirely incorporated herein by reference.

BACKGROUND OF THE INVENTION

The present invention relates to a fitting for a vehicle seat, in particular for a motor vehicle seat, having a lockable latching fitting for the fine adjustment of the inclination of the backrest between a plurality of use positions and for selectively locking the backrest in the use positions, and a lockable free-pivoting device for moving the backrest beyond the use positions.

In order, in the case of known vehicle seats, to achieve a table position, in which the backrest is in an approximately horizontal position, a fitting has been designed which combines an unlockable latching fitting, as is customary for the usual adjustment of the inclination of the backrest, with an unlockable, eccentric free-pivoting device, as is customary for two-door motor vehicles, in order to obtain the necessary pivoting angle. A disadvantage in this case is that because of the asynchronous locking of the latching fitting, after actuation of the free-pivoting device the backrest is no longer securely locked, and that the effect of an additional force (backrest compensation spring of the latching fitting) may result in inadvertent movements of the system, as a result of which there is, for example, the risk of fingers becoming jammed.

BRIEF SUMMARY OF THE INVENTION

One aspect of the present invention is the provision of an improved fitting for a vehicle seat, in particular for a motor vehicle seat, having a lockable latching fitting for the fine adjustment of the inclination of the backrest between a plurality of use positions and for respectively locking the backrest in the use positions, a lockable free-pivoting device for moving the backrest beyond the use positions, and coupling means by way of which unlocking of the free-pivoting device only takes place after unlocking of the latching fitting.

By virtue of the coupling means, by way of which unlocking of the free-pivoting device only takes place after unlocking of the latching fitting, in the case of a vehicle seat having two fittings according to the invention, the torsions and angular differences which occur over the width of the vehicle seat are eliminated and a secure locking of both latching fittings in the same angular positions is ensured. The coupling means can be configured in such a manner that a positively controlled unlocking of the free-pivoting device takes place, which also facilitates the actuation. Apart from the case of a table function, the invention can also be used in the case of a customary free-pivoting function, so that actuating processes which are separate per se (adjustment of the inclination over small angles, and free-pivoting over large angles) can be combined in a common actuating option.

In the case of a common design of the latching fitting, which design can be produced in a simple manner with a fitting lower part and a rotatable fitting upper part, and a design of the eccentric free-pivoting device with a pivotable catch or hook for locking to a bolt or the like fixed on the structure, the coupling means are preferably provided between the fitting upper part and the catch, so that the catch opens at the latest in a certain angular position of the backrest. A coupler for this purpose, which coupler is preferably of rigid design and is fitted in an articulated manner and is simple to produce and fit, i.e. is a cost-effective tractive (e.g., pulling) means, can be provided with an idle stroke device, for example a slot and tenon guide, in order to remain inactive within various use positions and only to respond at a relatively great pivoting angle.

A safety device is preferably provided. When pivoting back the backrest, the safety device functions so that locking of the latching fitting only takes place after locking of the free-pivoting device. In the case of the above-mentioned, common design, the safety device can be designed as a pivotable, two-armed lever which uses the one arm to monitor the position of the latching bolt and uses the other arm to interact with a control element of the fitting upper part. The control element is effective in the circumferential direction, and it is preferably provided at a certain angle on the fitting upper part in the manner of a step, or the like. As a result, locking of the latching fitting is blocked until the locking of the free-pivoting device has taken place. The safety device operates in the rear direction of movement to complement the coupling means, which acts in the forward direction of movement.

In a preferred design, a monitoring device is also provided. The monitoring device functions so that the unlocking and locking of the free-pivoting device only takes place at certain settings of the latching fitting, in particular only if the backrest has been pivoted forward relative to the seat part. As a result, unlocking of the free-pivoting device in the use positions can be prevented. In addition, the sequence of movement and the relative movement between the components can be controlled better. For example, striking of the backrest against the vehicle roof lining can be avoided. In the case of the above-mentioned, common design, the monitoring device can be effective between the catch and the control element of the fitting upper part. The control element extends over a certain angular region about the rotational axis and forms a type of guide for a control finger of the catch. The control element, for example an elongate, curved cam or a disk cam, can simultaneously form the control element for the safety device.

The invention is not restricted to vehicle seats with table functions and free-pivoting functions of the backrest. It can also be used, for example, if, for a package position or the like in a rear row of seats, a foot is only to be disengaged if the backrest has been folded flat onto the seat part. The free-pivoting device can then generally be seen as a folding device for the entire vehicle seat about the front foot.

BRIEF DESCRIPTION OF THE DRAWINGS

The invention is explained in greater detail below with reference to two exemplary embodiments illustrated in the drawing, in which.

DETAILED DESCRIPTION OF THE INVENTION

Figure 1:
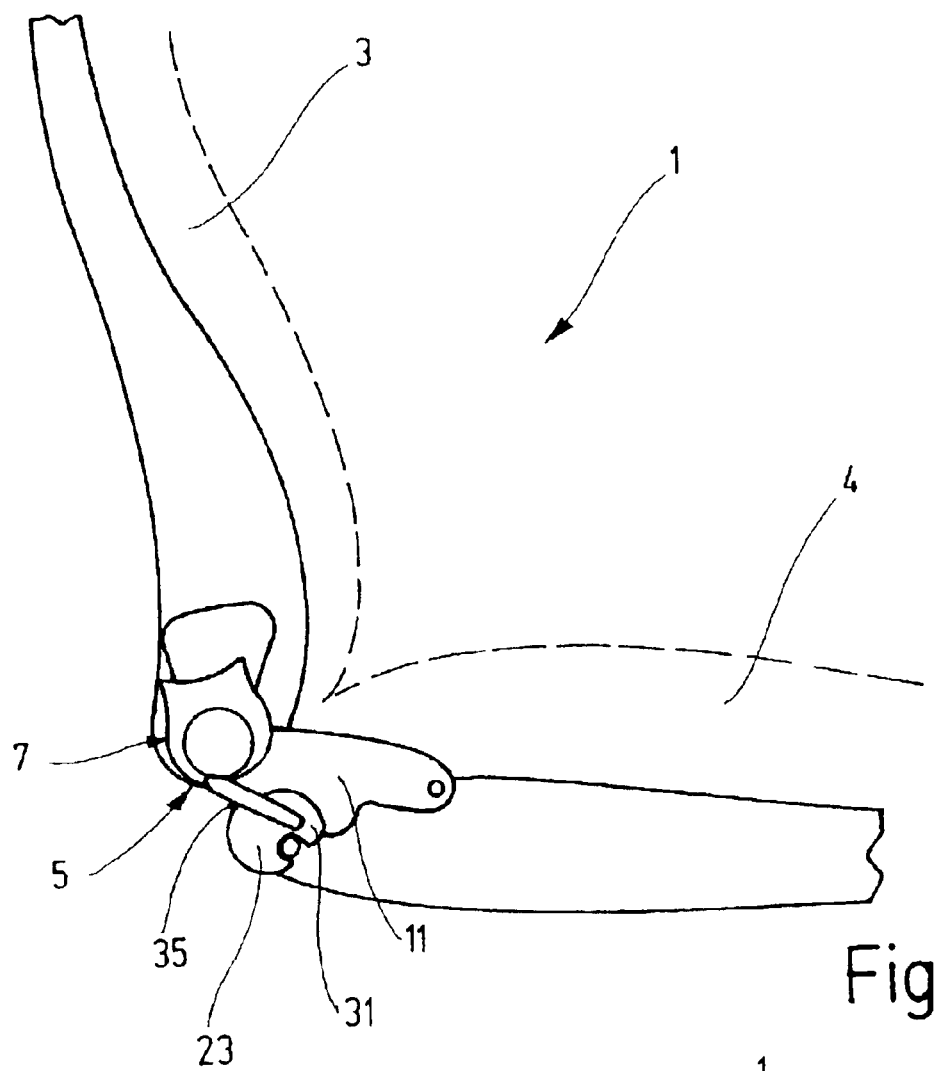
FIG. 1 shows a partial view of the structure of a vehicle seat with upholstery indicated, in a use position.
Figure 2:
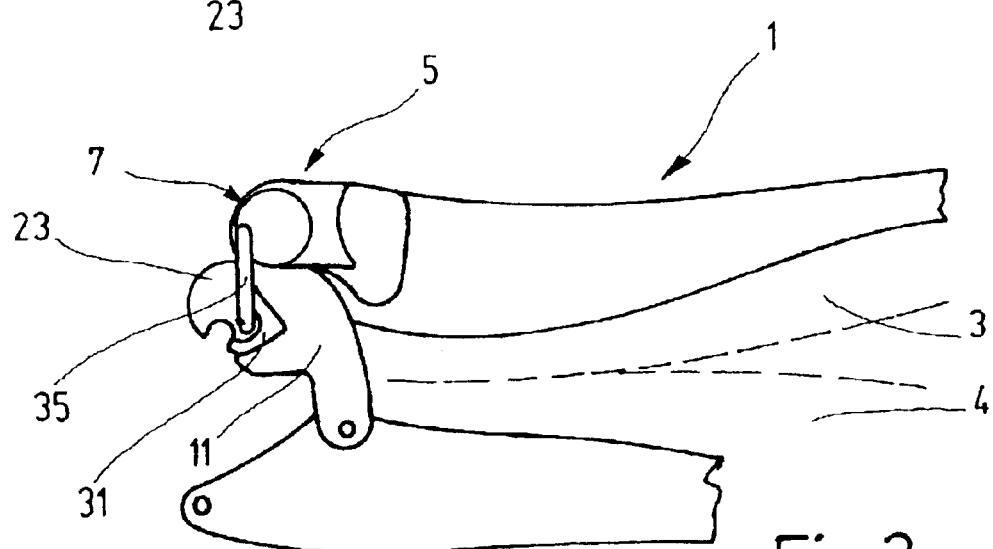
FIG. 2 shows an illustration corresponding to FIG. 1 in the table position.
Figure 3:
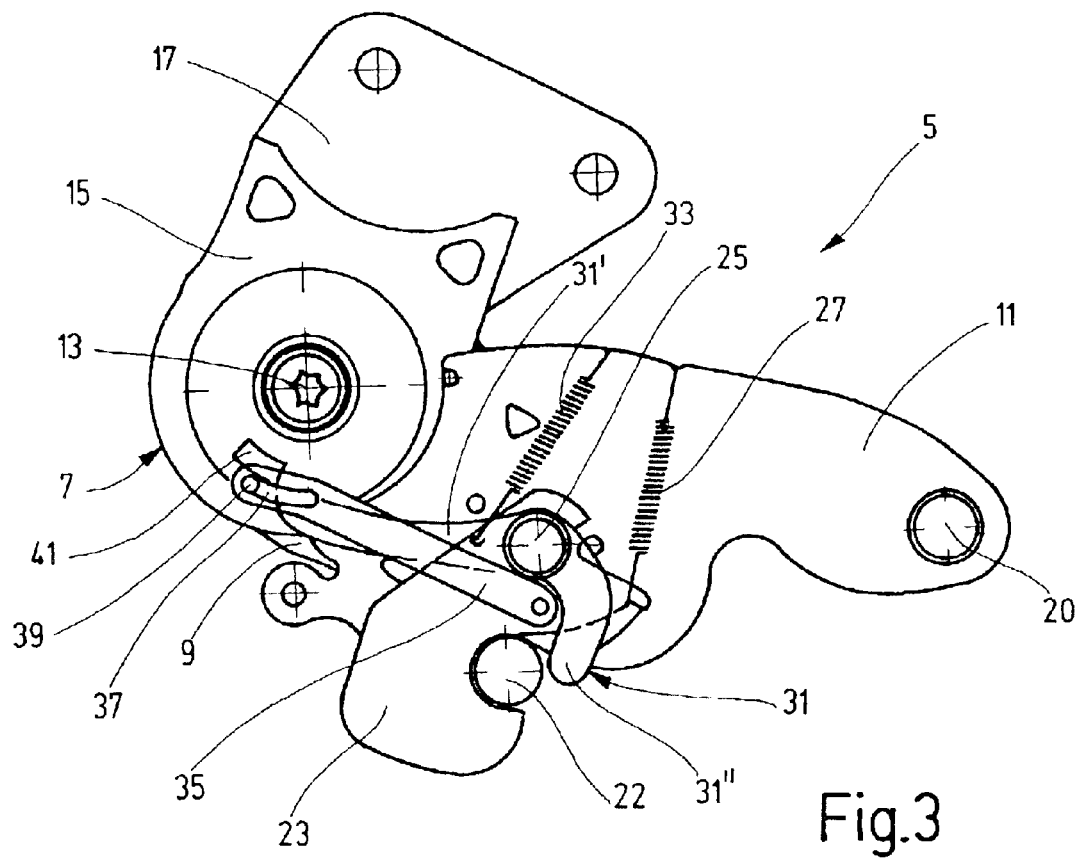
FIG. 3 shows a view of the first exemplary embodiment shortly before the catch is unlocked.
Figure 4:
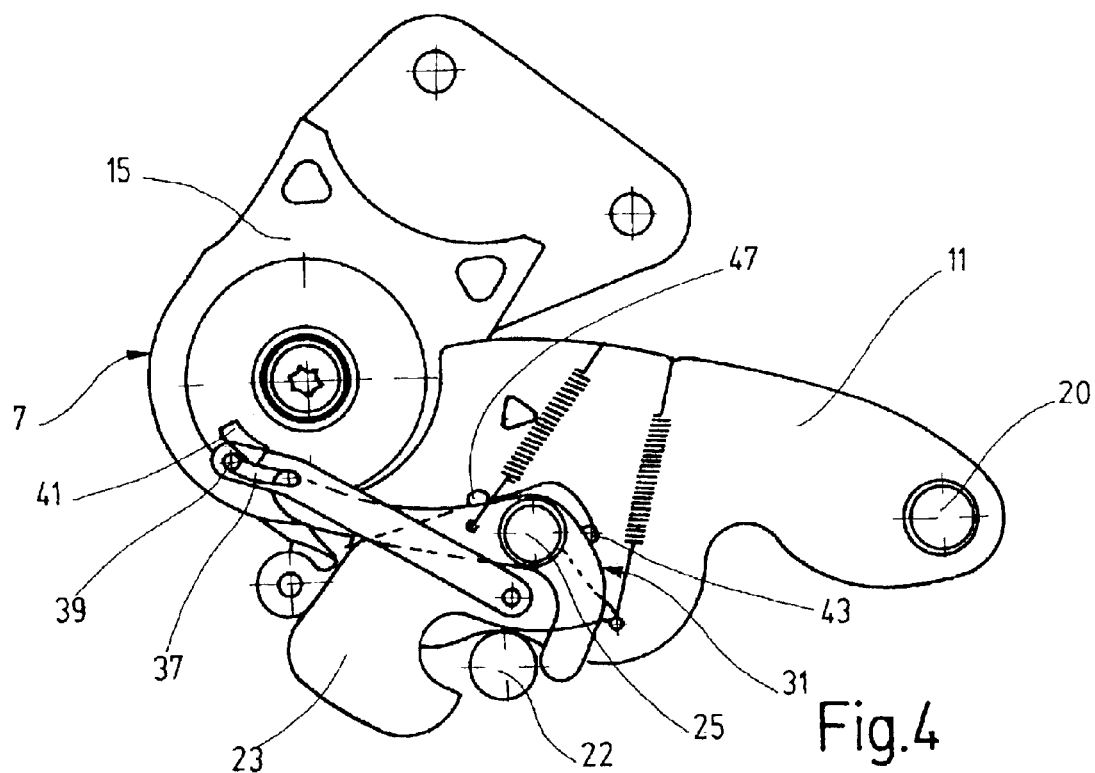
FIG. 4 shows an illustration corresponding to FIG. 3 shortly after the catch is unlocked.
Figure 5:
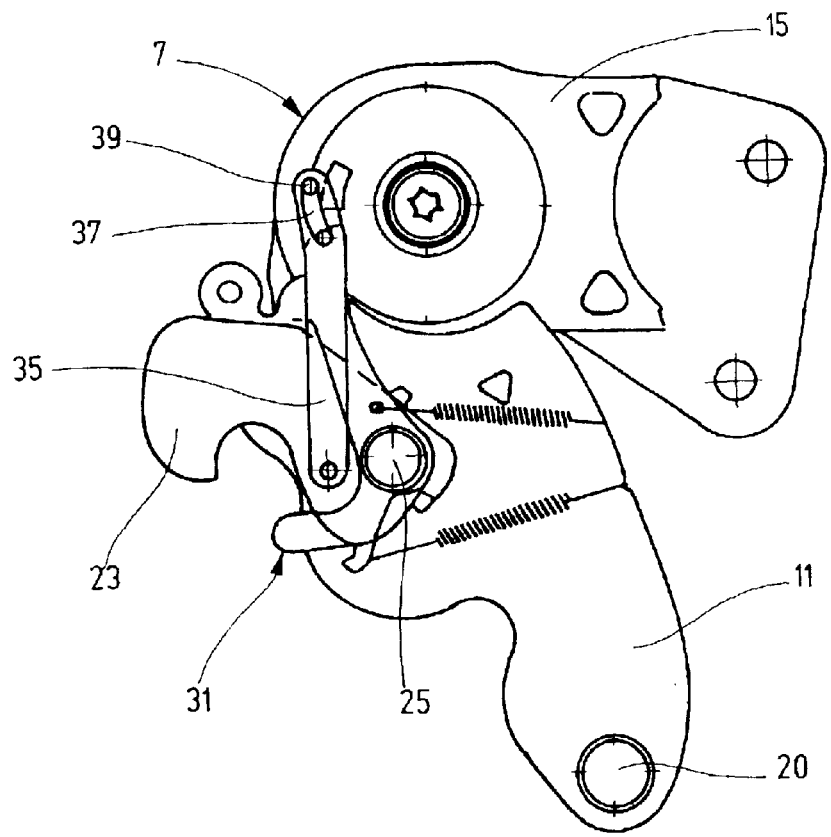
FIG. 5 shows an illustration corresponding to FIG. 3 in the table position.
Figure 6:
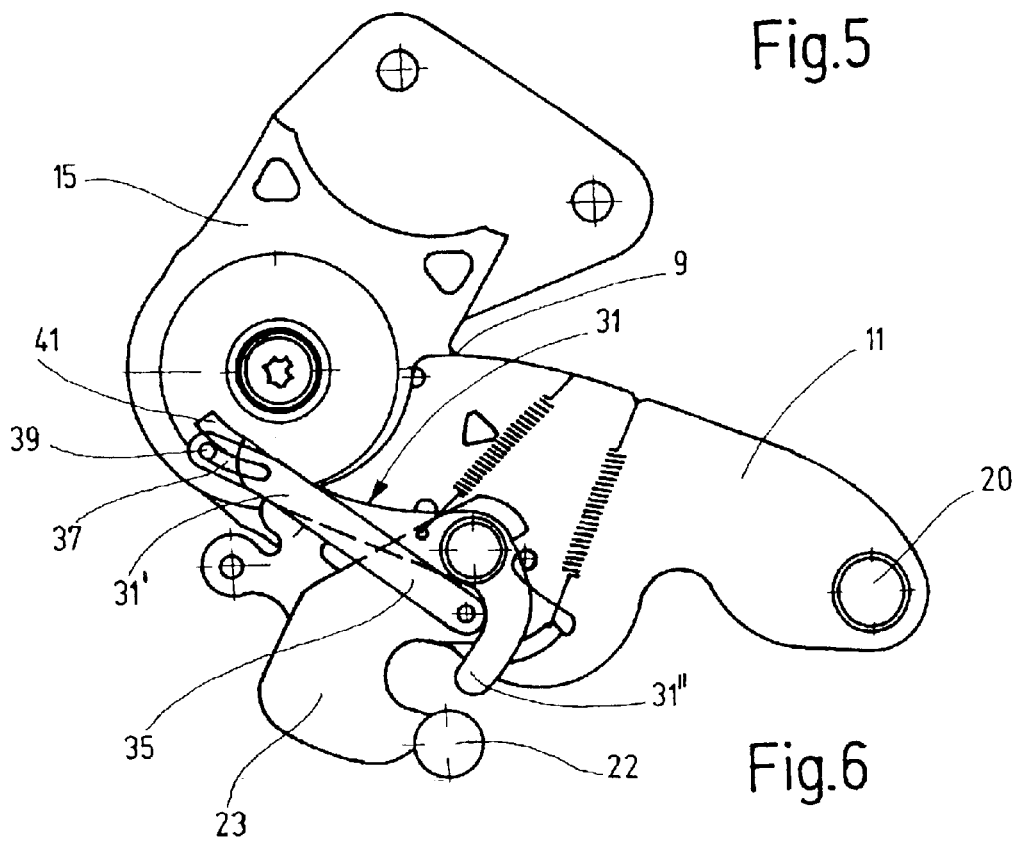
FIG. 6 shows an illustration corresponding to FIG. 3 shortly before the locking of the catch.
Figure 7:
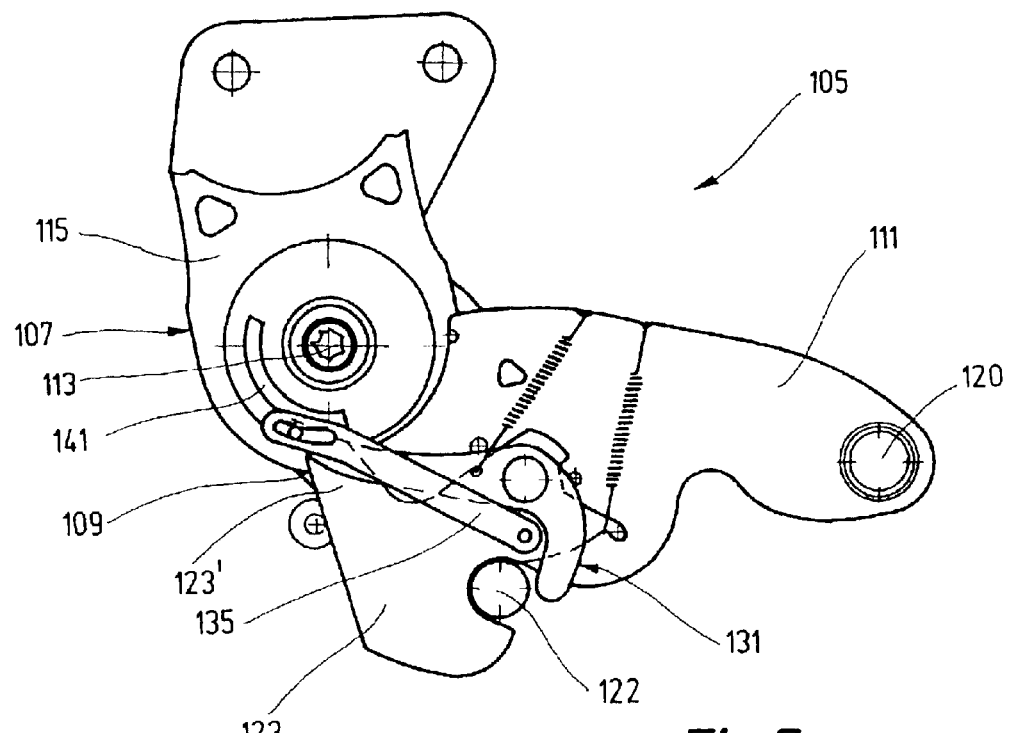
FIG. 7 shows a view of the second exemplary embodiment in a use position.
Figure 8:
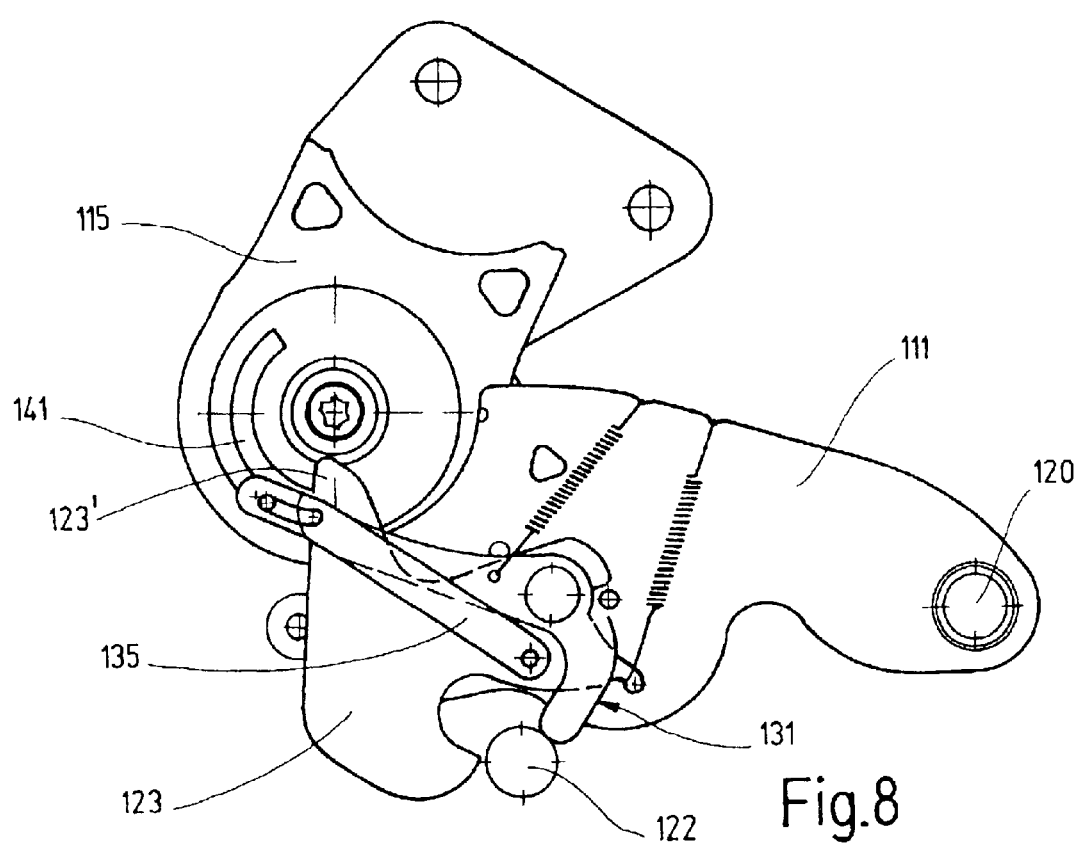
FIG. 8 shows an illustration corresponding to FIG. 7 shortly after the catch is unlocked.

In the first exemplary embodiment, a vehicle seat 1 for a motor vehicle has a respective fitting, which is denoted in its entirety by the numeral 5, on both of the sides of the vehicle seat. The fitting 5 is for adjusting the backrest 3 of the vehicle seat 1 relative to the seat part 4 of the vehicle seat. The backrest 3 can be adjusted between a plurality of use positions, for which purpose the fitting 5 has a latching fitting 7 for fine adjustment purposes. The latching fitting 7 comprises a fitting lower part 9 which is welded onto an adapter 11, and a fitting upper part 15 which can be rotated relative to the fitting lower part 9 about an axis of rotation 13 and is welded onto a further adapter 17 for fastening to the structure of the backrest 3.

The latching fitting 7 can be locked and unlocked in a manner known per se, by way of movable latches (not illustrated). The latches for locking and unlocking the latching fitting 7 can be controlled by a shaft which is in alignment with the axis of rotation 13 and acts at the same time as a transmission rod between the fittings 5 on both sides of the vehicle seat 1. Means in the interior of the latching fitting 7 cause the engagement of the latches to be restricted preferably to certain regions of relative angle positions between the fitting upper part 15 and fitting lower part 9.

The adapter 11, which is fitted to the fitting lower part 9, is pivotably mounted on the structure of the seat part 4, for example on the seat frame, by way of an adapter bearing bolt 20. In the use positions of the backrest 3, the adapter 11 rests on a latching bolt 22 which is fixed on the seat-part structure and is likewise fitted, for example, to the seat frame. The cylindrical latching bolt 22 is engaged around over approximately half of its circumference by a hook mouth of a catch 23. This mouth is open in the direction of travel and is pivotably mounted on the adapter 11 by way of a catch bearing bolt 25. A spring, which is hooked at one end on the adapter 11 and at the other end eccentrically on the catch 23 and is referred to in the following as catch spring 27, causes the catch 23 to be prestressed in the closing direction, i.e. toward the latching bolt 22.

Furthermore, a safety lever 31 is mounted pivotably on the catch bearing bolt 25. The safety lever 31 has a long arm 31', which points to the rear, which is opposite to the direction of travel. The safety lever 31 further includes a short arm 31", which is angled downward with respect thereto. A tension spring, referred to below as lever spring 33, engages on the long arm 31' of the safety lever 31 and pulls the short arm 31" into contact against the latching bolt 22. A coupler 35 is articulated on the catch 23 with its one end eccentrically to the catch bearing bolt 25. The coupler 35 is arranged with respect to the safety lever 31 on the side remote from the catch 23. The other end of the coupler 35 has an elongated hole 37 which encloses, in the manner of a slot and tenon guide, a coupling pin 39 which protrudes from the fitting upper part 15 and is arranged eccentrically with respect to the axis of rotation 13. A stop cam 41 is provided on the fitting upper part 15, radially between the coupling pin 39 and the axis of rotation 13, in the plane of the safety lever 31. The stop cam 41 projects from the fitting upper part 15 in the axial direction with respect to the axis of rotation 13 at least by approximately the material thickness of the safety lever 31.

For the free pivoting in two-door motor vehicles or for free pivoting to a table position of the backrest 3 or for free pivoting to a package position of the vehicle seat 1 in a rear row of seats 2, referred to in the following in short as free pivoting, the catch 23 can be disengaged, preferably by way of a manual actuating device, so that the fitting 5 functions as a free-pivoting device. Then, the backrest 3 together with the fitting 5 can be pivoted forward about the adapter bearing bolt 20, i.e. eccentrically with respect to the axis of rotation 13.

For this purpose, first of all the latching fitting 7 is unlocked on both sides of the vehicle seat 1 and the backrest 3 is pivoted forward about the axis of rotation 13. In this case, the coupling pin 39 moves within the elongated slot 37, at its rear end. The latching fitting 7 for the time being remains unlocked in these angular positions between the fitting upper part 15 and fitting lower part 9, even if the actuating device is released. After the coupling pin 39 has reached the end of the elongated hole 37, the coupling pin 39 carries along the catch 23 via the coupler 35. The catch 23 pivots counter to the force of the catch spring 27 until it is in contact against a catch stop 43 and releases the latching bolt 22. The fitting upper part 15 passes into contact against an upper-part stop on the adapter 11.

With a further torque applied to the backrest 3, the adapter 11, which is now unlocked, begins to pivot about the adapter bearing bolt 20 carrying along the entire fitting 5. As soon as the short arm 31" is removed from the latching bolt 22 by this eccentric free-pivoting movement, the lever spring 33 pulls the safety lever 31 against a lever stop 47. The free end of the long arm 31' of the safety lever 31 is now at approximately the same radial distance from the axis of rotation 13 as the stop cam 41. With this configuration of the components, the free-pivoting movement of the backrest 3 about the adapter bearing bolt 22 continues until the desired end position of the backrest 3, for example the table position with the front side of the backrest 3 in contact against the upper side of the seat part 4, is reached.

During the return into a use position, a torque is first of all applied to the backrest 3 so that the fitting upper part 15 pivots back about a few angular degrees until the stop cam 41 comes into contact against the free end of the long arm 31' of the safety lever 31. The fitting upper part 15 is now held relative to the fitting lower part 9 in a position in which it cannot be locked. The relative movement between the stop cam 41 and safety lever 31 causes the coupler 35 to move slightly toward the catch 23, with the result that the catch can pivot somewhat in the closing direction owing to the force of the catch spring 27.

The backrest 3 together with the fitting 5 is pivoted back about the adapter bearing bolt 20 until a run-on slope of the catch 23 comes into contact against the latching bolt 22, and the catch 23 then pivots in the opening direction counter to the force of the catch spring 27, utilizing the slot and tenon guide between the elongated hole 37 and coupling pin 39 until the catch 23 can use the hook mouth to engage on the latching bolt 22 and locks the adapter 11. The latching bolt 22 then presses the short arm 31" of the safety lever 31 to the side, as a result of which the long arm 31' of the safety lever 31 is pivoted away from the stop cam 41.

The fitting upper part 15 can now be pivoted relative to the fitting lower part 9 in the direction of a locking position.

The coupling pin 39 moves again relative to the coupler 35 within its elongated slot 37. As soon as the backrest 3 has reached the desired use position, the latching fitting 7 can lock synchronously together with the latching fitting on the other side of the vehicle seat 1.

The second exemplary embodiment largely corresponds with the first exemplary embodiment, so identical components bear reference numbers incremented by 100. The fitting 105 likewise has a latching fitting 107 with a fitting lower part 109 and a fitting upper part 115 which can be rotated relative to the latter about an axis of rotation 113. The adapter 111, which can be pivoted about the adapter bearing bolt 120 fixed on the seat-part structure, is fitted fixedly on the fitting lower part 109. The catch 123 is locked by the latching bolt 122, which is fixed on the seat-part structure. The coupler 135 is provided between the catch 123 and the fitting upper part 115. During the pivoting back process, the safety lever 131 prevents locking of the latching fitting 107 by coming in the pivoting direction into contact against a control cam 141 which is fixed on the fitting upper part, is bent approximately in the shape of a quarter of a circle about the axis of rotation 113 and corresponds in this function to the stop cam 41 of the first exemplary embodiment. The interaction of the above-mentioned components, also with the further, corresponding components, takes place as in the first exemplary embodiment.

The control cam 141 has further functions additionally to the first exemplary embodiment. A control finger 123' is provided on the catch 123, at the end remote from the hook mouth for the latching bolt 122. The control cam 141 projects with respect to the stop cam 41 of the first exemplary embodiment from the fitting upper part 115 in the axial direction with respect to the axis of rotation 113 at least to an extent such that it corresponds to the sum of the material thicknesses of safety lever 131 and control finger 123', and extends over a relatively large angular region in the circumferential direction.

In the use positions, the control finger 123' is situated in contact against the radially outer side of the control cam 141, slides, during pivoting movements of the latching fitting 107, along this outer side of the control cam 141 and therefore prevents unlocking of the catch 123. As soon as the fitting upper part 115 has pivoted forward sufficiently far, the control cam 141 releases the control finger 123', and the catch 123 can pivot in the opening direction. In the process, the control finger 123' passes radially further inward with respect to the latching fitting 107 and now prevents a closing pivoting movement of the fitting upper part 115 with the control cam 141.

That which is claimed:

1. A fitting for pivoting a backrest of a vehicle seat relative to a reference structure, the fitting comprising:
    a lockable latching fitting including a fitting upper part mounted for rotating relative to a fitting lower part about an axis of rotation, wherein the fitting upper part is for carrying the backrest, and the latching fitting is for:
        finely adjusting inclination of the backrest between a plurality of use positions, with the finely adjusting including the fitting upper part rotating relative to the fitting lower part about the axis of rotation, and respectively locking the backrest in the use positions;
    a lockable free-pivoting device mounted for moving the backrest beyond the use positions while the free-pivoting device is unlocked, wherein the free-pivoting device has a pivotably mounted catch for locking to a latching bolt, which is fixed on the reference structure, to lock the free-pivoting device; and
    a coupler for unlocking the free-pivoting device, wherein the coupler is positioned between the fitting upper part and the catch of the free-pivoting device, a first end of the coupler is connected to the fitting upper part, and a second end of the coupler is connected to the catch, so that the coupler connects the fitting upper part and the catch to one another in a manner so that unlocking of the free-pivoting device by way of the coupler only takes place after unlocking of the latching fitting.

2. A fitting according to claim 1, wherein the coupler is a rigid coupler which is fitted in an articulated manner and has an idle stroke device.

3. The fitting according to claim 1, further comprising a safety device mounted for preventing locking of the latching fitting until after locking of the free-pivoting device, whereby locking of the latching fitting occurs after locking of the free-pivoting device.

4. The fitting according to claim 1, further comprising a monitoring device for restricting unlocking and locking of the free-pivoting device to predetermined positions of the fitting upper part.

5. A fitting according to claim 4, wherein:
    the fitting upper part include a control element which extends over a predetermined angular region about the axis of rotation; and
    the monitoring device interacts with the catch and the control element for restricting the unlocking and the locking of the free-pivoting device to predetermined positions of the fitting upper part.

6. A fitting according to claim 1, wherein the coupler is a coupling means for unlocking the free-pivoting device in a manner so that unlocking of the free-pivoting device by way of the coupling means only takes place after unlocking of the latching fitting.

7. The fitting according to claim 1 in combination with the vehicle seat, wherein the fitting upper part is mounted to the backrest of the vehicle seat so that the backrest pivots with the fitting upper part relative to the fitting lower part about the axis of rotation.

8. The fitting according to claim 1, wherein the fitting further comprises a safety device mounted for preventing locking of the latching fitting until after locking of the free-pivoting device, whereby locking of the latching fitting occurs after locking of the free-pivoting device, and the safety device includes:
    a control element mounted to the fitting upper part for being effective circumferentially with respect to the axis or rotation, and
    a pivotably mounted lever including:
        a first arm for monitoring the position of the latching bolt, and
        a second arm for interacting with the control element.

9. A fitting for pivoting a backrest of a vehicle seat relative to a reference structure, the fitting comprising:
    a lockable latching fitting for:
        finely adjusting inclination of the backrest between a plurality of use positions, and
        respectively locking the backrest in the use positions;
    a lockable free-pivoting device mounted for moving the backrest beyond the use positions while the free-pivoting device is unlocked;
    a coupler for unlocking the free-pivoting device, wherein the coupler is mounted so that unlocking of the free-pivoting device by way of the coupler only takes place after unlocking of the latching fitting; and a safety device mounted for preventing locking of the latching fitting until after locking of the free-pivoting device, whereby locking of the latching fitting occurs after locking of the free-pivoting device, wherein:

the latching fitting includes a fitting upper part mounted for rotating relative to a fitting lower part about an axis of rotation;

the free-pivoting device has a pivotably mounted catch for locking to a latching bolt, which is fixed on the reference structure, to lock the free-pivoting device; and the safety device includes:

a control element mounted to the fitting upper part for being effective circumferentially with respect to the axis or rotation, and a pivotably mounted lever including:

a first arm for monitoring the position of the latching bolt, and a second arm for interacting with the control element.

10. The fitting according to claim 9, wherein the coupler is positioned between the fitting upper part and the catch.

11. A fitting according to claim 9, wherein the coupler connects the fitting upper part and the catch of the free-pivoting device to one another in a manner so that unlocking of the free-pivoting device by way of the coupler only takes place after unlocking of the latching fitting.

12. A fitting according to claim 9, wherein the coupler is a rigid coupler which is fitted in an articulated manner and has an idle stroke device.

13. A fitting according to claim 9, further comprising a monitoring device that interacts with the catch and the control element for restricting unlocking and locking of the free-pivoting device to predetermined positions of the fitting upper part.

14. A fitting for pivoting a backrest of a vehicle seat, comprising:

a lockable inclination adjusting device including a fitting upper part mounted for rotating relative to a fitting lower part about axis of rotation, wherein the fitting upper part is for carrying the backrest and the inclination adjusting device is operative for:

adjusting inclination of the backrest between a plurality of use positions, with the adjusting including the fitting upper part rotating relative to the fitting lower part about the axis of rotation, and locking the backrest in at least one of the use positions;

a lockable free-pivoting device mounted for moving the backrest beyond the use positions, with the free-pivoting device including a locking catch mounted for moving between:

an unlocked configuration, in which the free-pivoting device can move the backrest beyond the use positions, and a locked configuration in which the free-pivoting device is prevented from moving the backrest beyond the use positions; and a coupler that connects the locking catch of the free-pivoting device and the fitting upper part of the inclination adjusting device to one another in a manner so that the locking catch is moved from the locked configuration to the unlocked configuration in response to predetermined pivoting of the fitting upper part relative to the fitting lower part about the axis of rotation.

15. A fitting according to claim 14, wherein the coupler is a rigid coupler which is fitted in an articulated manner and has an idle stroke device.

16. A fitting according to claim 14, further comprising a safety device mounted for preventing locking of the latching fitting until after locking of the free-pivoting device, whereby locking of the latching fitting occurs after locking of the free-pivoting device.

17. A fitting according to claim 14, further comprising a monitoring device for restricting the unlocking and the locking of the free-pivoting device to predetermined positions of the fitting upper part.

18. The fitting according to claim 14, wherein the coupler is a coupling means for unlocking the locking catch in a manner so that unlocking of the locking catch by way of the coupler only takes place in response to said predetermined pivoting of the fitting upper part.

19. The fitting according to claim 14 in combination with the vehicle seat, wherein the free-pivoting device is mounted to a seat part of the vehicle seat, and the fitting upper part is mounted to the backrest so that the backrest pivots with the fitting upper part relative to the fitting lower part about the axis of rotation.

* * * * *